Figure 1:
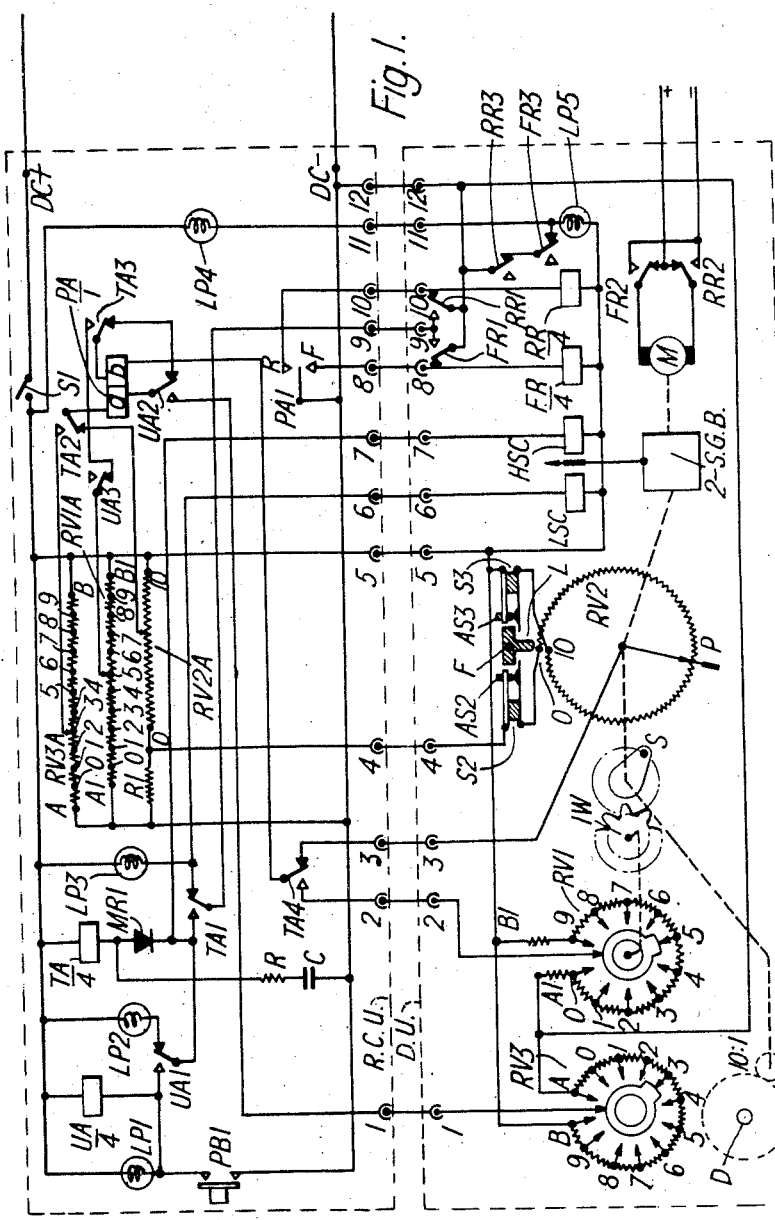

United States Patent Office 2,884,577
Patented Apr. 28, 1959

2,884,577

DIGITAL MOTOR POSITION CONTROL SYSTEM

Kenneth J. Coppin, Swindon, England, assignor to E. K. Cole Limited, Southend-on-Sea, England Application June 26, 1957, Serial No. 668,144

Claims priority, application Great Britain June 28, 1956

25 Claims. (Cl. 318—29)

This invention relates to remote control systems for determining the rotary position of a shaft, of the type in which the position to be assumed by the shaft is determined by the selection of a predetermined balance condition of a Wheatstone bridge circuit, the detector arm of which comprises a centre-stable polarised relay which operates to control the direction of rotation of an electrically reversible prime mover which is arranged to effect rotation of the controlled shaft and of a travelling (rotary) contact of a potentiometer which comprises the "slave" pair of arms of the Wheatstone bridge circuit, and in which the said relay also operates to stop the controlled shaft and the travelling contact in the balance condition of the bridge.

An object of the present invention is to provide a remote control system, of the type referred to above, which is particularly suitable for use where the controlled shaft is required to make more than one complete revolution or where the number of revolutions of the travelling contact of the "slave" potentiometer corresponding to a full excursion of the controlled shaft is required to be large.

A feature of the present invention is a remote control system of the type referred to above, in which the potentiometer comprising the "slave" arms of the bridge has a substantially circular resistance element, the terminals of which element are close together, the travelling contact of said potentiometer being mechanically coupled to the controlled shaft in such a way that the said contact makes a large number of revolutions as the controlled shaft travels through its controlled range, and comprising means for effecting rotation of the travelling contact at low speed when it is within a predetermined range immediately preceding the achievement of the balance condition of the bridge, whereby the travelling contact and the controlled shaft come to rest in the balance condition substantially without oscillation, means for effecting high speed rotation of said travelling contact throughout its movement outside said predetermined range, reversible mechanical counting means adapted to count the revolutions of the travelling contact in accordance with its direction of rotation, pre-settable means associated with said counting means and adapted both to determine the direction of rotation of the travelling contact and to determine within which revolution of the travelling contact the balance condition of the bridge is to be achieved, and means for ensuring correct operation of the system in the event of the said balance condition requiring the said travelling contact to stop within a small arc within which lie the said terminals.

The prime mover employed in the system may conveniently be a reversible electric motor of conventional design. Such a motor may be a D.C. motor and one which operates from the same source of D.C. power supply that is used for the remainder of the system.

Figure 1B:
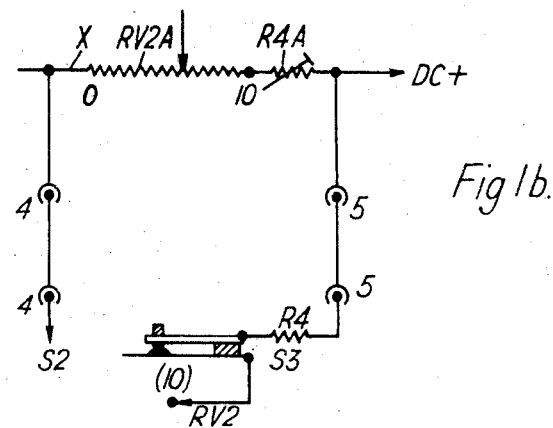
Figure 1A:
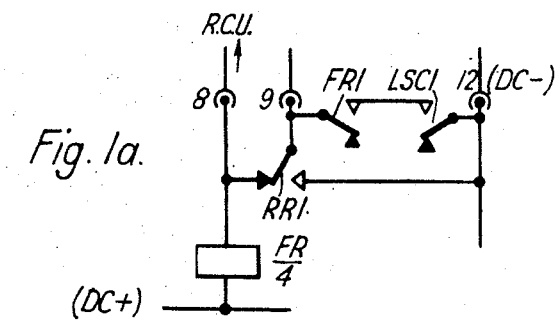
Figure 2:
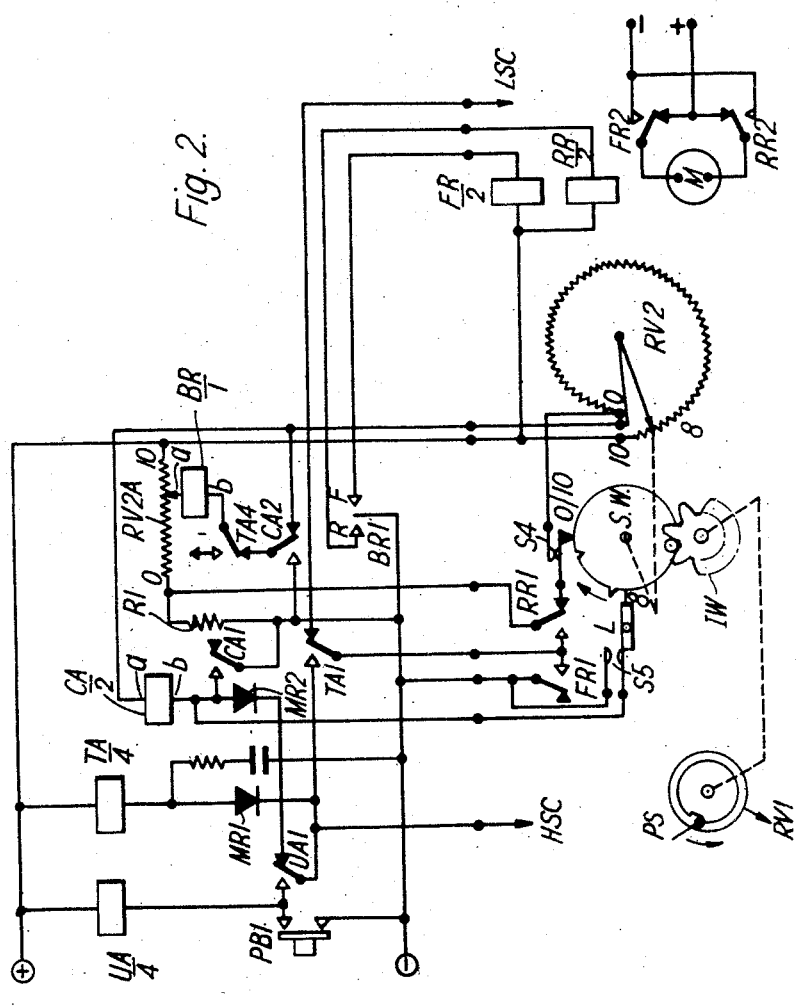

The above and other features of the invention will be readily understood from a perusal of the following description of one form of the invention with reference to the accompanying drawings, in which Figure 1 is a circuit diagram of a control system according to the invention; Figures 1a and 1b are modifications in certain details which may be made in Figure 1; Figure 2 is a circuit diagram illustrating modifications which may be made in Figure 1 to meet certain circumstances.

In the drawings, relays are indicated schematically by rectangles accompanied by reference characters which include a "denominator" which indicates the number of sets of contacts controlled by the relay concerned. These "denominators" are omitted from the following description in which the relays are referred to by their reference letters only, their sets of contacts being referred to both in the drawings and in the description by the reference letters followed by a numeral indicating the set concerned, and, except in the case of the contacts of polarised relays PA, BR, the "operated" contact of each set is shown by a hollow triangle and the "released" contact by a solid triangle.

GENERAL PRINCIPLES

The remote control system involves the use of a Wheatstone bridge circuit to determine the position to be assumed by the controlled shaft. The bridge circuit includes a potentiometer constituting the "slave" arms of the bridge and this potentiometer is provided with an arcuate resistance element and with a continuously rotatable travelling contact engaging the resistance element. The bridge circuit also includes a "master" potentiometer having an adjustable contact for selecting a predetermined balance condition of the circuit in accordance with the position to be assumed by the shaft.

Mechanical coupling means are provided between the travelling contact of the "slave" potentiometer and the controlled shaft, and the travelling contact is adapted to make a large number of revolutions when the controlled shaft travels through its controlled range (which may comprise more than one revolution of the shaft).

The position to be assumed by the shaft is determined in two stages, the first of which is reckoned in terms of the number of complete revolutions of the aforesaid travelling contact with respect to an arbitrary zero (which may correspond to one limit of the controlled range of the shaft). This first stage involves bringing the controlled shaft at least close to the position it is required to assume, and the final movement, if any, of the shaft to bring it to that position is determined in the second stage, which is reckoned in terms of a part of a revolution of the travelling contact, and that part is determined by the pre-set adjusted condition of the aforementioned "master" potentiometer.

The aforesaid first stage is determined by control means which are brought into operation before the Wheatstone bridge circuit is allowed to achieve its balance condition, and such control means may provide a single stage of control or a number of sub-stages. The control means for the first stage conveniently comprise a further Wheatstone bridge circuit, or a number of such circuits, and in the system illustrated in Figure 1, the first stage comprises two Wheatstone bridge circuits, which are balanced in a step-by-step manner, and the second stage comprises a final bridge circuit (viz., the bridge circuit containing the aforesaid "master" and "slave" potentiometers) which is brought to its balance condition in a continuous manner once the first-stage bridge circuits are balanced. Any convenient number of bridge circuits may be employed to make up the first stage and they are conveniently arranged on a decade basis, so that one bridge circuit controls one-tenth as much movement of the controlled shaft as does the immediately preceding bridge circuit.

In the second-stage bridge circuit a center-stable polarized relay is employed as a detector which is rendered operative only when the first stage has been completed. This is conveniently effected in the system of Fig. 1 by arranging that the polarized relay be switched into each bridge circuit in turn, so that the second-stage bridge circuit can only be brought to its balance condition when the preceding bridge circuits are balanced.

The controlled shaft and the aforesaid travelling contact are driven by means of an electrically reversible prime mover (conveniently a low voltage D.C. electric motor).

Mechanical counting means are provided for counting the revolutions of the travelling contact, and pre-settable means are provided, associated with the aforementioned relay and with the mechanical counting means, for controlling the direction of rotation of the travelling contact and of the controlled shaft and for stopping the said contact and shaft in the balance condition of the first-mentioned bridge circuit. In the system of Fig. 1, the pre-settable means comprise the "master" potentiometers of the various bridge circuits, each of the "master" potentiometers having a contact which may be pre-set in accordance with the position to be assumed by the shaft.

During movement of the shaft toward the position to be assumed, rotation of the said travelling contact is effected at low speed when it is within a predetermined range preceding the achievement of said balance condition so that the contact and the shaft come to rest in the balance condition substantially without oscillation, and rotation of said contact outside said predetermined range is effected at high speed.

Means are also provided for ensuring correct operation of the system in the event of the travelling contact stopping in such a position that it either short-circuits the potentiometer resistance winding or loses contact therewith. In the system of Fig. 1, the winding extends over an arc of substantially 360 degrees, so that its terminals are close together. In the event of the contact stopping in such a position that it connects those terminals together, the winding will be short-circuited, and in that event the preceding bridge circuit is necessarily unbalanced and the contact will therefore be driven past that position, and if the balance condition requires the contact to stop in that short-circuiting position, it will then be reversed toward that position, the preceding bridge circuit then being inoperative.

The system shown in Figure 1 is in the position in which the controlled shaft D has reached a chosen setting representing a setting of the shaft of 3.56 revolutions from an arbitrary zero position, all relay contacts being "released" and in which an on/off switch S1 has been moved to its "off" position. The system comprises a remote control unit R.C.U. shown in the upper large broken rectangle and a drive unit D.U. shown in the lower large broken rectangle. The symbols denoted by the two sets of numerals 1 to 12, close to the parallel adjacent sides of the two broken rectangles, represent plug and socket connections between the two units, the lines joining correspondingly numbered symbols representing the individual lead wires in a cable connecting the two units together. The division of components between the units is to some extent arbitrary. The remote control unit comprises "master" potentiometers RV3A, RV1A, and RV2A, respectively calibrated in terms of units, tenths, and hundredths of a revolution of the controlled shaft. These potentiometers form, respectively with "slave" potentiometers RV3, RV1 and RV2, arms of Wheatstone bridge circuits. Each potentiometer, of course, may be regarded as two bridge arms connected in series at the tapping contact of the potentiometer. The final or "basic" bridge circuit (RV2A and RV2) is that which finally determines the selected position of the controlled shaft D. Each "slave" potentiometer has a rotary travelling contact, those of potentiometers RV3 and RV1 being operated in a step-by-step manner by reversible mechanical counting means in a manner to be described later. The detector arm of each bridge circuit is provided by the insertion of a centre-stable polarised relay PA (Fig. 1) or BR (Fig. 2) sequentially into each bridge, commencing with the "units" bridge, then the "tenths" bridge and then the "hundredths" bridge.

Indicating lamps are provided in the remote control unit R.C.U. to indicate which bridge is in effective operation at any one instant. These lamps are designated LP1 ("units" bridge), LP2 ("tenths" bridge) and LP3 ("hundredths" bridge). Further indicating lamps LP4 and LP5 are provided to indicate, both in the remote control unit and in the drive unit, when the system has brought the controlled shaft to its selected position. The position to be assumed by the shaft is selected by adjustment of the pre-settable tapping contacts of "master" potentiometers RV3A and RV1A and by selection of the appropriate balance condition of the basic bridge RV2A, RV2 by means of adjustment of the tapping connector of "master" potentiometer RV2A. The "master" potentiometers are also conveniently of a rotary type construction, although they are not shown as such in the drawings. The settings of the "units" and "tenths" bridges are effective to determine the direction of rotation of the travelling contact of RV2 and also to determine within which revolution of that contact the balance condition of the basic bridge circuit is to be achieved.

The shaft D is coupled to the travelling contact of potentiometer RV2 via an accurate 10 to 1 reduction gear.

The winding of the resistance element of RV2 is substantially circular and its terminals are close together, the final turn of wire at one end being spaced from the final turn at the other end by a gap equal only in width to the width of one turn of wire (to permit insulation between the ends). This gap is necessary because the potential difference between the ends is much greater than that which exists between adjacent turns elsewhere in the winding. The turns are close-wound and conventional insulating coatings are relied upon for insulation between successive turns. The travelling contact of potentiometer RV2 is preferably of a roller construction (to minimise wear), but in which a small degree of skidding is preserved so that self-cleaning action is not entirely lost. This may be achieved by making the roller in the form of a frustum of a cone rotating about its own axis.

The travelling contact of potentiometer RV2 is fitted with pad P which, by rocking lever L about its fulcrum F, can open one or other of two springsets S2, S3. The contact-carrying shaft of potentiometer RV2 also carries a striker S adapted, once every revolution, to operate a ten-tooth impulse wheel IW on the shaft of potentiometer RV1 and to move the travelling contact of RV1 (shown connected to position 5) by one step, and the dimensions of the travelling contact of RV1 must be so related that the travelling contact establishes and maintains a "short-circuit" between some pair of adjacent tapping points on potentiometer RV1 so long as either of the spring-sets S2 or S3 is open (due to actuation by pad P, etc.)

The dimensions and relative positions of components P, L, S2, S3 are such that the springset in question is held open while pad P travels through a circular arc of some 5 to 10 degrees, springset S2 being opened by clockwise rotation of the travelling contact, and springset S3 by anti-clockwise rotation. Adjusting screw AS2 must be set so that S2 opens when the travelling contact (moving clockwise) reaches the clockwise end "10" of the winding of RV2, and adjusting screw AS3 is set so that S3 opens when the travelling contact (moving anti-clockwise) reaches the anti-clockwise end "0".

The shaft D carries a striker (not shown) similar to

S, which engages with a 12-tooth impulse wheel (not shown) on the shaft of potentiometer RV3. The travelling contact of this potentiometer (shown connected to position 3) and the relative positions of these parts must be such that a "short-circuit" is established and maintained between two adjacent tapping points of potentiometer RV3 whenever, and so long as, the tapping points "0" and "9" of potentiometer RV1 are "short-circuited" by its travelling contact.

The impulse wheels referred to above constitute, in conjunction with their strikers, a reversible mechanical revolution counter, which may be fitted with dials to indicate revolutions or other data, as will be referred to later.

The rest of the system of Figure 1 is best described by reference to its operation.

OPERATION

The circuit diagram (Figure 1), shows the system at rest, having reached the chosen setting, and the various relay contacts are shown connected in their "released" condition. To select a new position of the controlled shaft D, the "units," "tenths" and "hundredths" dials of the remote control unit are adjusted to the setting of the tapping contacts of the "master" potentiometers which represent the new position, which for example, might be 6.30 revolutions from the (arbitrary) "zero" position. The tapping contact of RV3A would, therefore, be set to "6," that of RV1A to "3" and that of RV2A to "0." A D.C. potential is applied to the system by switching on switch S1, and on pressing the "set" switch button PB1, "units" lamp LP1 lights and "units" relay UA operates. Relay contacts UA1 thereupon connect PB1 via rectifier MR1 to the "tenths" relay TA. (The relay TA is arranged so that it is "slow to release". One of the reasons for this is that the release of PB1 must not cause TA to release. This may be done by fitting a conventional "slug," but relays so fitted are not readily available in sealed types and, therefore, for generality, the circuit is arranged to provide the necessary slow release externally as later described. If the use of unsealed relays is permissible, a "slugged" type can be employed, and the delay circuit comprising resistor R, capacitor C and dry plate rectifier MR1 can be omitted.) Rectifier MR1 is arranged to conduct under the starting condition, and relay TA therefore operates also. Coil "a" of a polarised relay PA is therefore connected into the Wheatstone bridge circuit formed by potentiometers RV3 and RV3A via contacts TA2 and UA2. The polarised relay PA depicted is of the "double-wound" type, and is used at full sensitivity (both coils in "series-aiding" connection) for the final setting only, the reduced sensitivity obtained from either coil by itself being adequate otherwise. However, the circuitry can readily be arranged to utilise a single-coil type relay if desired. Coil "b" of relay PA is isolated by contacts UA3. Since RV3A has been set to "6" and RV3 is at present at "3" the bridge is unbalanced, the direction of the unbalance being such as to cause PA1 to close on its "F" (forward) contact. "Forward" relay FR therefore operates, and D.C. power supplies are connected to a reversible D.C. electric motor M via relay contact FR2 "operated" and relay contact RR2 "released" of "reverse" relay RR. This supply direction (polarity) is arranged to cause motor M to drive the travelling contact of potentiometer RV2 (via a 2-speed electromagnetic gearbox 2–S.G.B.) in a clockwise direction (i.e. towards higher settings). Since relay contacts TA1 and UA1 are "operated," relays UA and TA and lamp LP1 continue to receive supplies after the "set" switch button PB1 is released, because relay contacts FR1 are "operated," and therefore the two relays UA and TA remain energised and lamp LP1 remains illuminated. At each revolution of the controlled shaft D, its striker (not shown) moves the counter (the 12-tooth impulse wheel) and the travelling contact of potentiometer RV3 forward one step, until, at the commencement of the 6th revolution (from "0" of controlled shaft D) the striker carries the travelling contact from tap 5 to tap 6. The Wheatstone bridge (RV3, RV3A, and relay PA) is then balanced and relay PA therefore opens contacts PA1(F), thereby releasing the "forward" relay FR. Contacts FR1 thereupon open, and relay UA is released. "Units" lamp LP1, in parallel with relay UA, is extinguished. Relay TA does not at once release, however, because capacitor C, which has hitherto been discharged, commences to charge via relay TA and resistor R. The values of R and C are chosen to provide sufficient current to retain relay TA "operated" by this charging current for about 0.1 second. Rectifier MR1 obviates any possibility of charging current being drawn through relay UA or the lamps LP1 or LP2. During the short period for which relay TA is retained in the "operated" condition in this way, coil "b" of relay PA is connected into the Wheatstone bridge formed by potentiometers RV1 and RV1A via relay contacts TA3, UA3, and TA4. Contacts UA2, now "released," isolate coil "a" of relay PA, so that this Wheatstone bridge is in complete control. By virtue of the operation detailed above, the travelling contact of potentiometer RV1 is at this stage in contact with the "0" position, and, since the setting called for is 6.30 (i.e. includes 3 "tenths"), the bridge is unbalanced in such a way as to operate relay PA on its "F" (forward) contact. Relay FR is, therefore, "operated" and motor M consequently runs once again in such a direction that the travelling contact of potentiometer RV2 is driven clockwise. Relay TA remains operated and "tenths" lamp LP2 is illuminated via contacts FR1 and TA1. After 3 complete revolutions of the travelling contact of potentiometer RV2 (which makes 1 revolution for each tenth of a revolution of the controlled shaft D) striker S will have moved the travelling contact of potentiometer RV1 by means of impulse wheel IW, to tap 3. The bridge is, therefore, balanced, and contacts PA1(F) open, releasing relay FR. Consequently, after a small delay produced by the charging current of capacitor C, relay TA releases, and the polarised relay PA is connected into the "hundredths" Wheatstone bridge comprising potentiometers RV2 and RV2A, via contacts TA2, TA3, UA2 and TA4, all of which are "released" and so isolate the coils from other bridges. In this case, for added sensitivity, both coils of relay PA are used in "series-aiding" connection.

By reason of the adjustments described above, spring-sets S2 and S3 will be closed, and the travelling contact of potentiometer RV2 will be some 5° to 10° beyond the "0" position. Since the "hundredths" setting selected is "0," the controlled shaft has, in fact, been driven a little too far, for necessary reasons which will be discussed later under the heading "Avoidance of Counting Errors." Consequently, relay PA operates on its "R" (reverse) contact, operating "reverse" relay RR, which, by means of its "operated" contacts RR2 in conjunction with the "released" contacts FR2, causes motor M to start in the opposite direction. Hitherto, the system has been driven at high speed, because so long as either of the motor relays FR or RR was operated, a "high speed" electromagnetic clutch HSC was supplied via contacts TA1, which have hitherto been "operated." In the combined clutch and gearbox system depicted, the clutch HSC had therefore attracted the lever of the gear-box 2–S.G.B. into the high-speed position. (This lever is shown between HSC and LSC in Figure 1). Now, however, contacts TA1 are "released," and operation of relay RR causes a "low speed" electromagnetic clutch LSC to be operated (whereby the gear lever is attracted into the low-speed position) and also causes the "hundredths" lamp LP3 to be illuminated via contacts RR1 and TA1. The travelling contact of potentiometer RV2 is, therefore, driven at reduced speed back towards "0" (i.e. anti-clockwise). As soon as the "0" position is reached, the bridge balances, causing relay PA to open contacts PA1(R). Relay RR releases, stopping the motor, releasing the "low speed" clutch LSC, and extinguishing "hundredths" lamp LP3. Contacts FR3 and RR3 are now "released" and remain released together, so that the "set" lamps LP4 (in R.C.U.) and LP5 (in D.U.) remain continuously illuminated to indicate that the shaft D is set to the selected position, i.e. 6.30 revolutions from zero.

The purpose of the springsets S2 and S3 is to overcome difficulties which could arise in the event of "overshoot" in the case of "hundreths" settings near "0" or "10." Although the clutches HSC and LSC receive their supplies via the motor relays FR and RR, and are consequently released when balance is achieved (thereby uncoupling the motor M from the drive due to the gear-lever then being in "neutral"), the release of these clutches and relays is not instantaneous, and the system may therefore be driven by inertia beyond the true position of rest. Normally, this is of little consequence, except in so far as it can give rise to "hunting" (i.e. oscillation about the rest position), because an overshoot large enough to unbalance the "hundredths" bridge in the reverse direction will automatically be corrected, since it reverses the current through relay PA. For "hundredths" settings of "0" or "10," however, it will be apparent that, since the high and low potential ends of the winding of RV2 are immediately adjacent, any overshoot in either case can give rise to an unbalance current in the same direction. For example, suppose the travelling contact of RV2 to have been moving from "0" towards "10," RV2A being set at or near "10." Then relay PA1 will have closed contacts PA1(F), due to the potential at the tapping contact of RV2A being higher than that at the travelling contact of RV2. This condition will be maintained until the two potentials become equalised, when contacts PA1(F) will open, but, if inertia is sufficient to carry the travelling contact of RV2 beyond "10" its potential again drops to a very low value, because it is now in contact with the winding near the "0" end. Consequently, PA1(F) again closes (since the tapping contact of RV2A has a higher potential than the travelling contact of RV2), and so motion continues in the same direction instead of being reversed. Similar considerations apply in the case of settings at or near "0."

However, it is arranged that, during clockwise rotation of the travelling contact of potentiometer RV2 (i.e. from "0" towards "10"), springset contacts S2 are opened by means of lever L and pad P on the travelling contact at the instant the latter reaches "10." Consequently, the whole of the winding of RV2 takes up the potential of the end "10." If the setting required is "10," the bridge balances, and the drive stops, the consequent error being only that due to inertia. For a setting near to, but below, "10," this rise in potential of the whole of RV2 to the potential of the end "10" reverses the current through relay PA, and the drive is reversed, and so corrects the overshoot, the normal potential difference across RV2 being restored to enable the bridge to function again as soon as pad P (by moving away from "10") releases lever L and permits contacts S2 to close. In the case of travel in the reverse direction, springset contacts S3 are operated by pad P and lever L to cause the potential of the whole of RV2 to become that of the end "0" as soon as the critical point is reached. It will be seen that this arrangement has the same effect in respect of settings near "0" as the operation of S2 has in relation to settings near "10." Resistor R1 (of the lowest practicable value, to minimise loss of overall sensitivity due to its introduction) serves to prevent damage due to the short-circuit which would result when the travelling contact of RV2 is in the "0/10" position if springsets S2 or S3 were incorrectly adjusted. R1 may conveniently take the form of a high-wattage filament lamp, rated for the full supply voltage, whose resistance under "cold" conditions is much less than when the full voltage is applied.

In the case of "hundredths" settings other than "0" or "10," the "hundredths" bridge functions in the normal manner to bring the system to rest when the travelling contact of RV2 divides the latter in the ratio selected by the setting of the "hundredths" master potentiometer RV2A.

The sequence of operations involved if the setting selected incorporates a lower "units" figure than that already in existence is similar in broad outline, so that only essential differences need be described. Owing to the fact that the direction of unbalance in the "units" bridge is the opposite of that previously assumed, relay PA in these cases closes contacts PA1(R) and "reverse" relay RR operates. The motor is consequently started in the opposite direction, by means of contacts RR2 "operated" and FR2 "released," so that the travelling contact of potentiometer RV2 moves in an anti-clockwise direction (i.e., count decreasing). Contacts RR1 carry out the functions previously carried out by contacts FR1.

Because of the settings described above, the travelling contact of potentiometer RV1 will be in contact with tap number 9 when the "units" bridge balances and the travelling contact of potentiometer RV2 will be 5° to 10° from the end "10" when the "tenths" bridge balances, but these different conditions in no way affect the general behavior of the system.

AVOIDANCE OF COUNTING ERRORS

It will be observed that in both the "units" and "tenths" bridges (consisting of potentiometers RV3, RV3A, and RV1, RV1A respectively) resistors are introduced between the points of connection of the supplies (A, B; A1, B1) and the "0" and "9" terminals. These are necessary to obviate errors due to the fact that the travelling contacts must be of the "make-before-break" type. Consequently, in the absence of these resistors, the potential of each travelling contact would become that of the end "0" of the potentiometers as soon as the travelling contact reached the position in which it "short-circuited" taps "0" and "1." This would cause premature balancing of the bridge whenever a setting of "0" was selected. Similar considerations require the introduction of resistance between the "9" terminals and the high potential end of the supply, to avoid premature bridge balance when a setting of "9" is selected.

Special precautions have to be taken to ensure that each bridge is necessarily unbalanced when the subsequent one in the sequence is in an ambiguous state. Thus, the "short-circuit" of adjacent taps on the "tenths" potentiometer RV1 is preserved over the range for which springsets S2 or S3 may be open, to ensure that the "tenths" bridge remains unbalanced, until this condition, for which one or other pole of the supply to potentiometer RV2 is disconnected, is cleared. Similarly, the travelling contact of potentiometer RV3 is arranged to short-circuit adjacent taps, and so prevent the "units" bridge from balancing, while the "0" and "9" terminals of the "tenths" bridge are short-circuited. This ensures that the latter is functioning normally when the "units" bridge balances. Finally, the additional contacts A and B of potentiometer RV3 ensure that this unbalance in the "units" bridge is provided even for its "terminal" positions "0" and "9." In this way it is ensured that for all settings, any ambiguous condition in one bridge is automatically "resolved" as a result of the unbalance which it has necessarily produced in the preceding one, before it is permitted to take control.

It will be apparent from the nature of the circuits that the controlling relays UA and TA retain their supplies only so long as unbalance exists in the "units" and "tenths" bridges respectively. Thus, for instance, if a new setting is chosen which involves no change in the "units" figure, control passes to the "tenths" bridge immediately the "set" button PB1 is released. It will also be noted that contacts FR2, RR2 are arranged to short-circuit the armature of motor M, and so produce braking, when supplies are removed. This will only be effective, of course, with motors having permanent magnet or separately excited fields, but in general the use of a reduced driving speed when the "hundredths" bridge is in operation, coupled with the type of clutch described, can be arranged to provide adequate protection against "hunting" (i.e. oscillation about the rest position).

AVOIDANCE OF ERRORS DUE TO BACKLASH

It will be appreciated that the final rest position of the control shaft D is dependent on the final rest position of the travelling contact of "hundredths" potentiometer RV2, the remainder of the system constituting, in fact, a pre-set counter to define the particular revolution of this potentiometer in which this rest position lies. In the preceding description, it has been assumed that the "counter" gearing also serves to transmit the power to the controlled shaft. While this is advantageous from the point of view of compactness, it would be preferable, if heavy loads are to be controlled, to use a separate gear train for the transmission of power, in order that the "counter" gearing can work under the lightest possible load, the shaft of potentiometer RV2 being driven from the output shaft instead of vice-versa. In this way the wear on the gearing used for power transmission is prevented from giving rise to increased backlash, which will reduce the accuracy. Whatever system may be employed, however, backlash effects may be minimised by incorporating the circuit modification shown in Figure 1a, which has the effect of causing the final approach of the shaft D to the rest position to be uni-directional. In the arrangement hitherto described, the appropriate motor-control relay FR or RR drops out as soon as the associated contacts of the polarised relay (PA1(F) or PA1(R)) open as a result of bridge balance being reached. In Figure 1a the circuit of contacts FR1 and RR1, in association with a pair of contacts LSC1 operated by the low speed clutch LSC, has been modified to arrange that, when the latter is operated (i.e., during "hundredths" selection only) relay FR does not drop out until relay RR operates. Otherwise, the system functions as already described. The effect of the modification is as follows:

Assuming 'hundredths" selection to be in progress (relays UA and TA "released") and conditions to be such that PA1 is closed on its "F" contact, relay FR will be operated, and motor M is, therefore, driving the travelling contact of the "hundredths" potentiometer RV2 from "0" towards "10." The D. C. negative connection of relay FR (pin 8) extends via "released" contacts RR1 to pin 9 and thence via "released" contacts TA1 to pin 6 and the low speed clutch LSC. This clutch operates, putting the system into low gear and closing contacts LSC1, so that the coil of relay FR is now connected to D.C. negative via contacts RR1 (released) and FR1 and LSC1 (operated). Consequently, when the "hundredths" bridge balances, the opening of PA1(F) does not release relay FR, and the motor continues to drive, overshooting the balance position, until relay PA operates in the opposite sense, closing PA1(R), and operating relay RR. Operation of contacts RR1 disconnects relay FR from the D.C. negative line, and FR therefore releases. Although the clutch LSC is again operated via contacts RR1 (operated) and TA1 (released), contacts LSC1 are now disconnected from the coil of relay FR both by FR1 and RR1, and can no longer operate it. Consequently, the motor is reversed, and drives back towards the balance position. When this is reached, PA1(R) opens, releasing relay RR, and the system comes to rest. In this way it is ensured that, regardless of initial conditions, the travelling contact of the "hundredths" potentiometer RV2 can only come to rest from the anti-clockwise direction.

Since this arrangement has the effect, during "hun-dredths" operation, of causing relay FR, once operated, to remain operated until released by operation of relay RR, it is essential to ensure that the reversal of polarity across the coil of relay PA which is necessary to bring relay RR into operation, can be obtained for all positions of the travelling contact of potentiometer RV2. With the system of connections shown in Figure 1, relay PA closes contacts PA1(R) if the potential of the travelling contact of RV2 is higher than that of the tapping contact of RV2A, and this condition cannot be obtained for a "hundredths" setting of "10." The circuit must, therefore, also be modified as shown in Figure 1b, by the insertion of resistor R4 in the D.C. positive connection to potentiometer RV2. The value of R4 is chosen so that the potential difference developed across it is just sufficient to operate relay PA. Pre-set resistor R4A is similarly included in the D.C. positive connection to potentiometer RV2A, and adjusted, with springsets S2 and S3 closed, to equalise the potential of the positive end of RV2A with that of the positive end of RV2. These resistors, being very small, have no effect on the sensitivity of the system, and operation is un-affected except in the particular case when the "hundredths" setting is "10," when their operation is as follows:

Suppose the state to have been reached in which the "hundredths" bridge is in use and relay PA is operated on contact PA1(F), so that relay FR is "operated" and the travelling contact of potentiometer RV2 is travelling towards "10." When it reaches this setting, the bridge balances, and contacts PA1(F) open, but relay FR remains operated because of the modified circuit arrangement of Figure 1a. However, immediately any overrun occurs past the "10" position, pad P operates lever L and opens springset S3, so open-circuiting RV2 (see Figure 1). There is therefore, now practically no current through R4, and the potential of the "10" end of RV2 therefore rises above that of the "10" end of RV2A sufficiently to operate relay PA and close PA1(R). Consequently, relay RR operates, releasing relay FR and reversing the drive. As soon as the travelling contact of potentiometer RV2 returns to "10," pad P releases lever L, allowing springset S2 to close. Consequently, the potential of the end "10" of potentiometer RV2 returns to its normal value, and the bridge balances. Contacts PA1(R) open, releasing relay RR, and the drive stops.

OPERATION OVER LONG LINES

If it is required to operate the system over long lines, which have appreciable resistance (i.e. between D.U. and R.C.U.), it will be necessary, even if the anti-backlash arrangement just described is not employed, to introduce a pre-set resistor such as R4A in the position indicated in Figure 1b, and a similar pre-set resistor must also be inserted at point X (Figure 1b), in order to compensate for the voltage drop in the lines (4 and 5), as it is obviously essential to maintain equality of potential respectively at both the ends "0" and both the ends "10" of potentiometers RV2 and RV2A.

OPERATION ON DYNAMICALLY UNBALANCED LOADS

It has been assumed throughout that the equipment controlled is dynamically balanced (i.e. does not tend to displace itself). While in other cases the system will immediately operate to correct small errors due to self-displacement, the driving gear train should preferably incorporate a device such as a worm and worm wheel, which will not "drive back," so that such displacements do not occur.

POSITION INDICATION

The arrangement of the two clutches employed in the form of the invention here described is such that the motor M is uncoupled from the drive when supplies are switched off by switch S1. Consequently, the controlled shaft D can under this condition be freely rotated manually by means of a handle attached to the shaft of potentiometer RV2 (or to the controlled shaft D if preferred). If this potentiometer, and the "counters" (i.e. the impulse wheels IW, etc). are fitted with indicating dials, the controlled shaft may be turned manually to determine what settings are required for a specific operation, with the supplies "Off," the readings of the indicating dials corresponding to that position may be noted, and corresponding readings may later be set up on the remote control unit when that specific operation is required to be carried out, and the remote control unit will take control as soon as the supplies are switched on.

APPLICATION TO SYSTEMS POSSESSING CONSIDERABLE "BACKLASH"

The forms of the invention so far described are effective only where backlash is absent, or does not exceed the "dead arc" of the "hundredths" system. A modification will now be described which will give equally high accuracy in systems which have much greater backlash. For example, in the application of the device to the control of a lead-screw which may possess backlash to the extent of ⅓ of a turn or more, the mere fact that the final approach is uni-directional will not be effective in overcoming errors due to this cause, unless it is arranged that the "overshoot" in the case of an approach from the reverse direction is large enough for all backlash to be taken up on the return. Figure 2 is a skeleton circuit of a modified arrangement which meets this requirement. Only parts of the circuit which have been modified are included in the diagram; the remaining circuit arrangements and functions are as already described.

General circuit points to be noted are:

(i) Terminal "a" of a polarised relay BR is more positive than terminal "b" so long as the setting of the "master" units, "tenths," or "hundredths" potentiometers RV3A, RV1A, RV2A, as the case may be, are numerically higher than those of the corresponding "slave" potentiometers RV3, RV1, RV2. (It will be seen that relay BR replaces relay PA in Figure 1.)

(ii) Polarised relay BR closes contact BR1(F) when coil terminal "a" is more positive than "b," and contact BR1(R) in the opposite condition. (The operation of relay PA in Figure 1 is somewhat similar.)

(iii) Operation of relay FR causes the motor M to drive the travelling contact of "slave" potentiometer RV2 in the direction of numerically increased count. Operation of relay RR causes drive in the reverse direction.

The foregoing points are common to all versions of the invvention. The modifictaion peculiar to the form now described are:

(iv) The contacts S4 in the negative line to the "hundredths" slave potentiometer RV2 are modified and arranged to be open over an arc of 1° or less, centred about the "0/10" position of that potentiometer. Contacts RR1 of relay RR are additionally in series with this line.

(v) Contacts S5 are added, and arranged to close momentarily (via lever L), at a "hundredths" setting of about 8, when the system is running in the direction of numerically decreasing count only. (It will be seen that contacts S4 and S5 substitute an alternative mode of operation for that effected by springsets S2 and S3 in Figure 1.)

(vi) A pin and slot coupling P.S. is introduced between the "tenths" counting wheel IW and the "tenths" switch (i.e. the travelling contact on RV1). This is so arranged that the positions of switch and counter (IW) coincide when driving in the direction of numerically increasing count, but the switch position is permitted to be one "tenth" higher than the counter position when driving in the direction of numerically decreasing count.

(vii) The "tenths" switch (i.e. the travelling contact on RV1) is advanced or moved back at a "hundredths" count of (say), 8, instead of "0/10," the movement preceding its normal time in the case of numerically increasing count, and being delayed in the case of numerically decreasing count, e.g. a "count" of 2.7 would appear after 2.68 revolutions from "0."

(viii) A "carry" relay CA, and a rectifier MR2 are introduced, and the connections of the polarised relay BR to the "hundredths" slave potentiometer RV2 are taken via contacts CA2 of the relay.

MODE OF OPERATION

(a) Count increasing (1) It will be assumed that a setting of 6.29 is being selected, the previous setting having been lower. Operation is exactly as hitherto described, except that when "units" selection is complete, and "tenths" selection commences, terminal "b" of relay CA is connected via rectifier MR, and contacts UA1 and TA1 to contacts FR1 of relay FR, and is therefore "earthed" as long as relay FR is operated (as it will be with the system running in the direction of increasing count). Terminal "a" of relay CA is connected to the travelling contact of the "hundredths" slave potentiometer RV2, and consequently relay CA operates or releases according to whether the potential difference between this contact and "earth" is or is not greater than its operating potential difference. When a "count" of 6.18 is reached, the travelling contact of the "tenths" potentiometer RV1 will "step" to 6.2, since it is set to operate in advance. At this point, the potential difference applied to relay CA is sufficient to operate it, and, having operated, it provides an earth return for itself via contacts CA1. Relay BR opens its contact BR1(F) as a result of the "tenths" bridge having (apparently) reached the required setting of 6.2. Consequently, relay FR releases, opening contacts FR1, and relay TA is therefore released and contacts TA1 change over. This does not, however, release relay CA, because of the earth return via contacts CA1. Rectifier MR2 prevents this earth return from maintaining relay TA. Meanwhile, terminal "b" of polarised relay BR has been connected via "released" contacts TA4 and "operated" contacts CA2 to the D.C. negative line. Because the "0" end of the "hundredths" master potentiometer RV2A is at a higher potential than this owing to the potential difference across resistor R1, terminal "a" of relay BR is inevitably more positive than terminal "b" regardless of the position of the travelling contact of RV2, and consequently contacts BR1(F) close, operating relay FR.

(2) The system thus continues to drive in the direction of increasing count (though at reduced speed, because the release of relay TA has changed over contacts TA1, releasing the "high speed" clutch HSC, and operating the "low speed" clutch LSC. Drive continues until contacts S4 are opened momentarily as the travelling contact of the "hundredths' slave potentiometer RV2 reaches the "0/10" position. As soon as the contact moves clear of the point where it short-circuits this potentiometer, S4 closes again, and restores the D.C. negative connection to the potentiometer, and the contact, being only just clear of the "0" position, has a very low potential (that developed across R1 only), and so relay CA releases, transferring the connection of terminal "b" of relay BR (by release of contacts CA2) to the travelling contact of the "hundredths" slave potentiometer RV2. The travelling contact of the "hundredths" slave potentiometer RV2 therefore continues to run until it reaches a setting of "9" when relay BR releases, and the drive stops.

*Note.*—It is essential for the correct functioning of this arrangement that the drive in the "low speed" condition should be slow enough to avoid overshoot. It may also be remarked that, in passing through the "6.28" position, the systems will have advanced the "tenths" switch (i.e. the travelling contact of RV1) to "3" but this has no effect, since the "tenths" bridge is disconnected. It means, however, that if dials are fitted to record the settings of the system, the "tenths" dial must be driven by direct 1:10 gearing from the shaft of the "hundredths" potentiometer RV2, and must not be coupled to the travelling contact of RV1, which could give incorrect indications. It will be realised that the position reached is the correct one, regardless of the early operation of the "tenths" counter, because the system continues to use the "zero" of the "hundredths" bridge as reference.

(b) *"Hundredths" count decreased: other unchanged*

Although the "hundredths" bridge is already connected, with this arrangement it is essential to operate the "set" switch button PB1, even if the "hundredths" setting only is changed, at any time when the existing count is higher than "8," if the new setting is to be lower. Otherwise an error in count of one "tenth" can result.

Considering first a change of count from, say 6.25 to 6.21. Since the initial count contains a "hundredths" figure less than "8," the "units" and "tenths" settings are initially correct and both bridges balanced, so that as soon as the "set" switch button PB1 is released, "units" relay UA and "tenths" relay TA release, without operating relay CA, since neither of the relays FR or RR will be "operated." The "hundredths" bridge therefore comes into operation with the potential of terminal "a" of relay BR lower than that of terminal "b." (In this case, the same would occur if the "set" switch button PB1 were not operated.) Relay BR therefore closes on contact BR1(R) operating relay RR, and causing the motor M to commence to drive in the direction of decreasing count. Contacts RR1 remove the D.C. negative connection to the "hundredths" slave potentiometer RV2, the whole of which therefore takes up the potential of the D.C. negative line, and therefore the potential of terminal "b" of relay BR remains above that of terminal "a" regardless of the position of the travelling contact of RV2. Drive therefore proceeds in reverse at low speed since the "low speed" clutch LSC is operated via resistor R1 (of very low value) and contacts RR1 (operated) and TA1 (released). The setting of the "hundredths" slave potentiometer RV2 is reduced to "0" but drive still continues until it reaches a setting of "8" in the next "tenth" lower, i.e. 6.18. A projection of the associated striker wheel S.W. then operates lever L and closes springset S5 which operates relay CA.

Relay CA retains its supplies via contacts CA1 and its contacts CA2 transfer the connection of terminal "b" of relay BR to D.C. negative. Since this means that the potential of terminal "b" is now lower than that of terminal "a," relay BR changes over, releasing relay RR and operating relay FR, and the remainder of the operation of selecting the new position proceeds as in paragraph (a)(2) above. The effect of the arrangement is that, whenever selection is made, requiring movement "in reverse," the drive is taken so far past the new position that all backlash is necessarily taken up in returning to the new position in the "forward" direction.

If the change of count had been from 6.29 to 6.21 the "tenths" switch would actually have registered "3" when the set button was pressed, because it changed over at 6.28. Consequently, the "tenths" bridge would be unbalanced in such a way as to start the drive in reverse. However, as the system moved back through 6.28, the "tenths" switch setting would not decrease, because the pin and slot coupling P.S. would be disengaged. In fact, the drive would continue backwards for one whole revolution of the travelling contact of the "hundredths" potentiometer RV2 (i.e. to 6.18) before the coupling P.S. re-engaged and changed the count to 6.2. At this point the "tenths" bridge balances, and operation proceeds as in the preceding paragraph, because relay CA has been "operated" by the closure of S5 as the setting of 6.18 was reached. The "tenths" counter will be stepped forward one position as the drive returns towards the desired setting, but again it will not affect the switch position (6.2) because of the play allowed by the pin and slot.

(c) *"Units" and/or "tenths" count decreased*

The general operation is as in (b), the important point being that the play in the pin and slot coupling P.S. will cause the system to run backwards to a setting having a "tenths" figure one lower than that selected before the "tenths" bridge moves into a balancing position, and then return travelling forwards as described in the preceding paragraph.

GENERAL REMARKS

The controlled shaft D may be utilised to control the movement of a mechanical system (e.g. to control the extent of movement of a lead-screw in machine-tool apparatus) and the controlled movement may be either rotary or linear (e.g. by the interposition of suitable mechanical couplings). Where linear movement is required to be effected in two directions, two control systems may be employed, one for each direction, and both systems may be operated simultaneously if desired.

In the arrangements described, it is convenient to use a D.C. power supply of 25 to 30 volts for the system and to use the same source of supply for the motor M. With a motor having a shaft which rotates at 6000 revolutions per minute, it is convenient to employ a reduction of 50 to 1 for the high-speed gear and a further reduction from that of 40 to 1 for the low-speed gear (i.e. a total reduction, from motor shaft speed, of 2000 to 1 for the low-speed gear).

It is, of course, possible to use other forms of prime mover which can be reversed by electrical means. For example, a single-phase A.C. electric motor may be adapted for use where it is convenient to employ a single-phase alternating-current source of supply, in which case the D.C. supply for the system may be obtained by transformation and rectification from the A.C. supply.

Although in the arrangements described we have incorporated a single reversible electric motor as prime mover and have effected speed control by an arrangement of electromagnetic gearbox and clutches, we have used in an alternative arrangement (not shown) two reversible electric motors, one controlling the high-speed rotation of the travelling contact and the other controlling the low-speed rotation of the contact, and such an arrangement may be found preferable for heavy duty applications instead of a single motor and gearbox arrangement. Since in a two-motor arrangement both motors must each be capable of driving the controlled shaft, means should be provided to prevent either motor from driving the other, and in our two-motor arrangement a differential gearbox was utilised for this purpose in order to obviate the use of clutches.

In the counting means described, the first element of the counter (i.e. the 12-tooth impulse wheel referred to earlier) has two more positions than are necessary to cover the full excursion of the shaft in order to permit overshoot, if necessary, at both ends of the full excursion of the shaft. Apart from this first element, the counter described is arranged on a decade basis.

Indicating dials, if fitted, may be utilised to indicate the extent of rotary movement of the controlled shaft in relation to an arbitrary zero position (for example, in terms of whole revolutions and decimal fractions of a revolution). Alternatively, where the system is intended for use in controlling a linear movement, dials calibrated in terms of such linear movement may be employed.

Of the relays described, UA, TA (and CA) are conveniently of a sealed medium duty type, but the choice of relays for other positions, particularly FR and RR, will be determined by the current requirements of the prime mover.

Relays FR and RR may, if desired, be utilised to operate further contacts (not shown) for controlling the operation of clamps which may be applied to apparatus controlled by the system, for the purpose of locking the apparatus in the position into which it is moved when the balance condition of the basic bridge circuit is achieved.

Where there might be any danger of obstruction of the motion of the apparatus controlled by the system, a torque-limiting clutch may be interposed between the prime mover and the controlled shaft, the point at which the clutch is inserted necessarily being one at which its operation does not change the positional relationship between the controlled shaft and the controlling system.

As a further safety measure, additional mechanically operated contacts (not shown) may be connected into the system in such a way that they disconnect the supplies to the prime mover when the controlled shaft reaches either limit of its full excursion.

Various other modifications may be made in the arrangements described without exceeding the scope of the invention.

I claim:

1. A remote control system for determining the rotary position of a shaft, comprising a Wheatstone bridge circuit, means for selecting a predetermined balance condition of said shaft, a potentiometer comprising the "slave" arms of said bridge circuit, an arcuate resistance element for said potentiometer, a continuously rotatable travelling contact engaging said resistance element, means comprising an electrically reversible prime mover for effecting rotation of said shaft and of said travelling contact, mechanical coupling means between the travelling contact and the controlled shaft whereby the contact makes a large number of revolutions as the controlled shaft travels through its controlled range, mechanical counting means for counting the revolutions of the travelling contact, a center-stable polarized relay for detecting said balance condition, pre-settable means associated with said relay and with said counting means for determining the direction of rotation of said travelling contact and for stopping said contact and said controlled shaft in the said balance condition of the bridge circuit, said pre-settable means including means for determining said shaft position first in terms of complete revolutions of said travelling contact and a "master" potentiometer for said bridge circuit for determining any further setting of the shaft to said position in terms of part of a revolution of said travelling contact, means for effecting said rotation of the travelling contact at low speed when it is within a predetermined range preceding the achievement of said balance condition, whereby the travelling contact and the controlled shaft come to rest in said balance condition substantially without oscillation, means for effecting rotation of the travelling contact at high speed throughout movement thereof outside said predetermined range, and means for ensuring correct operation of the system in the event of the travelling contact stopping in such a position that it either short-circuits the said resistance element or loses contact therewith.

2. A remote control system according to claim 1, in which means are provided whereby, when the travelling contact is being rotated in one only of its two possible directions, the said contact is caused to overshoot the position corresponding to the balance condition and then to reverse its direction of rotation and come to rest in said last-mentioned position, for the purpose specified.

3. A remote control system according to claim 1, comprising at least one further Wheatstone bridge circuit, and in which said pre-settable means include a master potentiometer for said further bridge circuit for selecting a predetermined balance condition of said further bridge circuit in accordance with an approximate setting of the controlled shaft, and comprising means associated with said counting means for bringing said further bridge circuit in a step-by-step manner into its balance condition before the first-mentioned bridge circuit becomes effective to determine the final setting of the controlled shaft, and in which means are provided for ensuring, at least in the case of the final pair of bridge circuits, that the preceding bridge of the pair is temporarily unbalanced whenever the travelling contact of the "slave" potentiometer of the succeeding bridge passes through the position in which it short-circuits the resistance element of its potentiometer.

4. A remote control system according to claim 3, comprising a total of three Wheatstone bridge circuits, means for causing one of said bridge circuits to determine the number of whole revolutions to be traversed by said controlled shaft, means for causing the second succeeding bridge circuit to determine further traverse of the shaft in terms of tenths of a revolution thereof, and means for causing the third succeeding bridge circuit to determine any further traverse of the controlled shaft to its selected position in terms of hundredths of a revolution of the shaft.

5. A remote control system according to claim 3, in which means are provided for switching said polarised relay successively into the detector arm of each bridge circuit.

6. A remote control system according to claim 4, in which means are provided for switching said polarised relay successively into the detector arm of each bridge circuit.

7. A remote control system according to claim 5, in which said polarised relay is of the double-wound type, and in which said switching means are utilised to connect both coils of the relay in series-aiding manner into the bridge circuit which determines the final setting of the shaft, and in which said switching means are utilised to connect one only of said coils into any preceding bridge circuit.

8. A remote control system according to claim 6, in which said polarised relay is of the double-wound type, and in which said switching means are utilised to connect both coils of the relay in series-aiding manner into the bridge circuit which determines the final setting of the shaft, and in which said switching means are utilised to connect one only of said coils into any preceding bridge circuit.

9. A remote control system according to claim 3, in which means are provided for indicating at any one instant which bridge circuit is in effective operation and for indicating when the controlled shaft has reached its selected position.

10. A remote control system according to claim 4, in which means are provided for indicating at any one instant which bridge circuit is in effective operation and for indicating when the controlled shaft has reached its selected position.

11. A remote control system according to claim 5, in which means are provided for indicating at any one instant which bridge circuit is in effective operation and for indicating when the controlled shaft has reached its selected position.

12. A remote control system according to claim 6, in which means are provided for indicating at any one instant which bridge circuit is in effective operation and for indicating when the controlled shaft has reached its selected position.

13. A remote control system according to claim 1, in which the said prime mover comprises a reversible D.C. electric motor, and in which electromagnetic means are provided, associated with said motor, for effecting said low-speed rotation and said high-speed rotation.

14. A remote control system according to claim 3, in which the said prime mover comprises a reversible D.C. electric motor, and in which electromagnetic means are provided, associated with said motor, for effecting said low-speed rotation and said high-speed rotation.

15. A remote control system according to claim 4, in which the said prime mover comprises a reversible D.C.

electric motor, and in which electromagnetic means are provided, associated with said motor, for effecting said low-speed rotation and said high-speed rotation.

16. A remote control system according to claim 1, in which the said prime mover comprises two reversible electric motors, and comprising means for utilising one of said motors to control the said low-speed rotation of the said travelling contact, means for utilising the other of said motors to control the said high-speed rotation of the said travelling contact, and means for preventing each motor from driving the other.

17. A remote control system according to claim 3, in which the said prime mover comprises two reversible electric motors, and comprising means for utilising one of said motors to control the said low-speed rotation of the said travelling contact, means for utilising the other of said motors to control the said high-speed rotation of the said travelling contact, and means for preventing each motor from driving the other.

18. A remote control system according to claim 4, in which the said prime mover comprises two reversible electric motors, and comprising means for utilising one of said motors to control the said low-speed rotation of the said travelling contact, means for utilising the other of said motors to control the said high-speed rotation of the said travelling contact, and means for preventing each motor from driving the other.

19. A remote control system according to claim 1, in which the system comprises two assemblies, namely a "drive unit" and a "remote control unit," said "drive unit" including the controlled shaft and said "remote control unit" including the bridge balance selecting means and the said pre-settable means, and comprising means in the "drive unit" for facilitating coupling between the controlled shaft and apparatus to be controlled by the system, and means in the "remote control unit" for providing an indication of the state of operation of the system.

20. A remote control system according to claim 3, in which the system comprises two assemblies, namely a "drive unit" and a "remote control unit," said "drive unit" including the controlled shaft and said "remote control unit" including the bridge balance selecting means and the said pre-settable means, and comprising means in the "drive unit" for facilitating coupling between the controlled shaft and apparatus to be controlled by the system, and means in the "remote control unit" for providing an indication of the state of operation of the system.

21. A remote control system according to claim 4, in which the system comprises two assemblies, namely a "drive unit" and a "remote control unit," said "drive unit" including the controlled shaft and said "remote control unit" including the bridge balance selecting means and the said pre-settable means, and comprising means in the "drive unit" for facilitating coupling between the controlled shaft and apparatus to be controlled by the system, and means in the "remote control unit" for providing an indication of the state of operation of the system.

22. A remote control system according to claim 19, comprising manually operable means in the "drive unit" for setting the controlled shaft to a required position, and indicating means in the "drive unit" for providing an indication of said required position in a manner which readily permits of the setting up of the said selecting means and pre-settable means in the "remote control unit" whereby that required position may be selected for determination by operation of the system.

23. A remote control system according to claim 20, comprising manually operable means in the "drive unit" for setting the controlled shaft to a required position, and indicating means in the "drive unit" for providing an indication of said required position in a manner which readily permits of the setting up of the said selecting means and pre-settable means in the "remote control unit" whereby that required position may be selected for determination by operation of the system.

24. A remote control system according to claim 21, comprising manually operable means in the "drive unit" for setting the controlled shaft to a required position, and indicating means in the "drive unit" for providing an indication of said required position in a manner which readily permits of the setting up of the said selecting means and pre-settable means in the "remote control unit" whereby that required position may be selected for determination by operation of the system.

25. A remote control system according to claim 1, in which the resistance element of the said "slave" potentiometer extends over an arc of substantially 360 degrees, the terminals of said element being close together.

References Cited in the file of this patent
UNITED STATES PATENTS

| | | |
|---|---|---|
| 2,543,950 | Yardeny et al. | Mar. 6, 1950 |
| 2,643,355 | Hallmon | June 23, 1953 |
| 2,814,013 | Schweigofer | Nov. 15, 1957 |